United States Patent [19]
Baldyga et al.

[11] 3,816,154
[45] June 11, 1974

[54] SILICA GEL FLATTING AGENT
[76] Inventors: Henry Baldyga, 8 S. Rolling, Cantonville, Md. 21228; Thomas Elias McGoury, 14 Riggs Rd., Severna Park, Md. 21146
[22] Filed: May 18, 1973
[21] Appl. No.: 361,538

[52] U.S. Cl. .......... 106/308 O, 106/272, 106/308 F
[51] Int. Cl. ............................................. C08h 17/00
[58] Field of Search ............ 106/308 O, 308 F, 272

[56] References Cited
UNITED STATES PATENTS

| | | | |
|---|---|---|---|
| 1,264,092 | 4/1918 | Kipper | 106/308 F |
| 2,838,413 | 6/1958 | Young | 106/272 |
| 3,266,923 | 8/1966 | Morway et al. | 106/308 F |
| 3,607,337 | 9/1971 | Eisenmenger | 106/272 |

*Primary Examiner*—Delbert E. Gantz
*Assistant Examiner*—Juanita M. Nelson
*Attorney, Agent, or Firm*—Michael J. McGreal

[57] ABSTRACT

A very effective flatting agent for varnishes and lacquers is a silica gel which has been melt-coated with a miscible mixture of a wax and an organic fatty acid. The wax and the fatty acid should have a melting point above about 40°C, with the melting point of the wax and the fatty acid being less than the decomposition point of either of these components. The silica gel has an average particle size between about 2 microns and 10 microns, and preferably has a very narrow particle size distribution. When admixed into a lacquer or varnish, these silica gels create a light diffusing surface which gives the visual effect of a dull finish.

12 Claims, No Drawings

SILICA GEL FLATTING AGENT

This invention relates to a new silica gel flatting agent. In one aspect it relates to silica gel flatting agents which are suitable for use in varnishes and lacquers. In another aspect it relates to varnishes and lacquers which contain silica gel as the flatting agent.

The high gloss usually associated with clear varnish and lacquer finishes is not always desirable. In the furniture industry, for example, a high gloss finish is generally characteristic of inexpensive merchandise, while expensive furniture traditionally presents a rich appearance due to its dull satin finish. This finish is obtained by a process of hand-rubbing the clear high gloss finish with some abrasive such as pumice mixed with oil or water. The effect of the rubbing treatment is to gently abrade the surface, causing a slight roughness on the surface of the finish, which diffuses light reflections and renders the shiny surface dull or flat. This operation is expensive and time-consuming and, although hand-rubbing is still practiced to some extent, the same effect may be obtained by incorporating a proper flatting agent into the varnish or lacquer.

Various natural and synthetic materials have been tried and used as flatting agents for varnishes and lacquers. Some of these are the metallic soaps, gums, resins and diatomaceous earth. These all flat varnishes and lacquers, however, have certain disadvantages either because they are expensive or fail to perform satisfactorily in the varnish or lacquer. Silica aerogels and xerogels have been known to flat varnishes and lacquers, but they have the defect of settling to the bottom of the lacquer or varnish on storage. In some instances, it is almost impossible to redisperse the settled-out silica. The first successful effort to produce a silica xerogel or aerogel which is readily dispersible in a lacquer or varnish, which does not settle-out on storage, and which produces excellent flatting properties is described in U.S. Pat. No. 2,838,413. The silica gel flatting materials of this patent have received wide commercial acceptance. The solution to the problem of preventing the settling-out of the silica gel during storage consisted of coating the silica gel particles with a wax material. This wax material coats the surface of the silica gel particles and flows into all or most of the pores, blocking these pores. This surface coating and pore blocking it is theorized, aids in maintaining the silica gel in a dispersed condition in the varnish or lacquer. The amount of wax on the silica gel may range from 5 percent up to 30 percent. The wax contents of the commercial grades of silica flatting agent, however, have been in the range of about 8 to 13 percent by weight. This wax content range has been found to be most effective.

The silica gel can be coated with the wax using various known techniques. In U.S. Pat. No. 2,838,413, there is disclosed a very useful technique of cocurrent coating of the silica gel with wax while the silica gel is being ground down to a particle size in the range of about 2 to 10 microns. The silica gel in this instance is being melt-coated with the wax since the fluid energy mill is operating above the melting point of the wax. The melted wax flows onto and over the surface of the silica gel particles and into some or all of the pores of the silica gel particles. U.S. Pat. No. 3,607,337 discloses a method of wax coating silica gel or precipitated silica which consists of aqueous emulsion coating of the silica. The disadvantage of emulsion coating of the silica particles is that on the breaking of the emulsion, the wax forms minute spherical particles which attach to the silica surface, but do not evenly flow over the silica surface and into some or all of the pores of the silica. The result in an aqueous emulsion coating technique is a silica gel particle speckled with small spheres of wax on its surface, as well as there being pieces of precipitated wax in the mixture not coated onto the silica. Melt coating of the wax on the silica is clearly the best technique for producing a wax coated silica gel.

The present invention is a definite improvement over the material of U.S. Pat. No. 2,838,413. It has been found that if the wax is co-mixed with from about 5 percent to about 50 percent of a fatty acid prior to melt-coating onto a silica gel, the resulting coated silica gel is much more easily dispersed in the varnish or lacquer medium, exhibits decreased settling, and has improved light diffusing properties.

It is not known why there is an increase in the ease of dispersion and an increase in the light diffusing properties of the resulting varnish or lacquer surface by the use of a comixture of the wax and fatty acid. Waxes and fatty acids are to a degree related in structure. Chemically, waxes are defined as esters of high molecular weight monohydric alcohols with the common higher fatty acids. That is, in many of the natural waxes there is a high molecular weight alcohol and a high molecular weight fatty acid component in the wax ester. The synthetic waxes are high molecular weight straight chain hydrocarbon materials. The fatty acids are also straight chain fairly high molecular weight materials. Due to the similar structural features between the fatty acids and the waxes, compatible co-mixtures can be formed by these materials. These compatible co-mixtures can then be readily melt-coated onto the silica gel to produce the flatting agent material.

It is therefore a prime object of this invention to provide an improved wax coated silica flatting agent. The silica gel can be a silica aerogel or a silica xerogel. The coating on the silica gel is a melt coating of a co-mixture of a fatty acid and of a wax. The melt-coated co-mixture of a fatty acid and wax on the silica produces a flatting agent which is much more easily dispersed in a varnish or lacquer medium, and which has improved suspension retaining properties over long periods of storage. The silica gel, coated with the co-mixture of the fatty acid and wax, also gives improved flatting properties to the resulting varnish or lacquer surface.

In more detail this invention consists of impregnating a silica gel with a co-mixture of a fatty acid and a wax, each of these materials having a melting point greater than 40°C. The fatty acid and the wax, which are used in co-mixture, may be any of the known fatty acids or waxes which have a melting point greater than 40°C, are not soluble in a solvent used to form the varnish or lacquer, and which have melting points which are less than the decomposition point of either the fatty acid component or the wax component. The impregnation technique may be of many types. Those techniques set out in U.S. Pat. No. 2,838,413 are very useful and are preferred techniques for melt coating the silica with the fatty acid wax co-mixture. The fatty acid and the wax can be co-mixed prior to contact with the silica gel, or the silica gel can be contacted with the fatty acid or wax in separate steps, in either order. The preferred technique is to form a co-mixture of the wax and the fatty acid and then to contact the silica gel with this comixture in order to melt coat the silica gel particles.

Essentially any coating process which will form an intimate admixture of the silica gel with the fatty acid wax flatting agent material may be used. These techniques can consist of admixing the silica gel with the fatty acid-wax co-mixture at ambient temperature whereby both are solids in order to produce an intimate admixture of these solids followed by increasing the temperature of this admixture in order to melt the fatty acid wax mixture and thereby melt coat the silica gel particles. The silica gel particles may, in another embodiment, be added to a melt of the fatty acid-wax material whereby the silica gel is mixed into and coated by the fatty acid-wax material. Various equipment such as ball mills or ribbon blenders may be used for these types of coating processes.

A preferred method of coating the silica gel particles with the fatty acid-wax co-mixture is the co-milling of the silica gel and the fatty acid wax co-mixture in a fluid energy mill. This is also the preferred technique set out in U.S. Pat. No. 2,838,413. The advantage of using the fluid energy mill for this operation is that the silica can be simultaneously dried, sized, mixed with the fatty acid wax co-mixture and melt coated with this co-mixture in a time period of a few seconds or less. The process advantage of simultaneously performing three or four operations is a significant advantage. The fluid energy mill is operated so that the silica gel coated particles which emerge from the fluid energy mill have an average particle size in the range of about 2 to 10 microns and preferably have a narrow particle size distribution.

The silica gel may be fed to the fluid energy mill as either a hydrogel which contains in the range of about 50 to 80 percent water, or as a dry silica gel material. A dry silica gel, which may be a xerogel or an aerogel, will contain in the range of about 2 to 15 percent water by weight. When a silica hydrogel is fed to the fluid energy mill as the silica gel source material, the resulting product will have a moisture content in the range of about 10 percent water or less. In this instance the fluid energy mill, besides drying the silica, will simultaneously coat the silica with the fatty acid-wax co-mixture as well as size the silica to an average particle size in the range of 2 to 10 microns. When a dry silica gel is the source silica for the fluid energy mill, there may be some additional drying of the silica gel, but mainly the operations under way in the fluid energy mill are those of melt coating the silica gel particles and the sizing of these silica gel particles to the average particle size range of 2 to 10 microns.

The fatty acid may be any fatty acid which has a melting point above about 40°C. The waxes will generally have melting points greater than the organic fatty acid, and therefore the fatty acid should also have the property that it will not have any decomposition up to the melting point of the wax. Fatty acids which can be used are stearic acid, lauric acid, palmitic acid, myristic acid, α eleosteric acid and β eleosteric acid. The waxes which may be used are those having a melting point greater than 40°C, but which have a melting point less than the decomposition point of the fatty acid which is to be comixed with the wax. Suitable waxes include the vegetable waxes such as caranabua wax, candlelila wax and sugar cane wax, the animal and insect waxes such as beeswax, spermaceti wax and shellac wax, the mineral waxes such as montan wax and the various petroleum waxes such as paraffin waxes and the synthetic waxes such as the polyene waxes which include the polyethylene waxes and polypropylene waxes and the oxidized hydrocarbon waxes such as the microcrystalline petroleum waxes. Any of these waxes may be used, however, the preferred waxes are the microcrystalline petroleum waxes and the polyene waxes. These waxes have a melting point in the range of about 65° to 80°C and are the preferred materials. The preferred fatty acids are stearic acid, lauric acid, palmitic acid and myristic acid.

The fatty acid and wax can be comixed in the solid or liquid state. The fatty acid and wax can be hardened by being cooled, ground to a particle size of less than about 100 microns, and comixed, or the fatty acid and wax can be comixed as a melt.

Depending on the mode of melt coating of the silica gel, the silica gel can be added to this melt or this fatty acid-melt can be cooled and ground. When melt coating is carried out in the fluid energy mill, the fatty acid-wax comixture is added as a solid.

Any of the commercially available fluid energy mills can be used in the preferred method of coating the silica gel. Some of these are the Jet Pulverizer, Micronizer, Jet-O-Mizer and Majac Mill. A detailed account of fluid energy milling operations is set out in Perry's Chemical Engineering Handbook, 4th Edition, McGraw-Hill Book Company, 1963, 8:42-43. U.S. Pat. No. 3,186,648 describes a preferred fluid energy mill. The fluid energy mill can be operated at any temperature at which the fatty acid-wax comixture is a melt up to the decomposition point of either of these components, however, when a silica hydrogel is fed to the fluid energy mill the temperature within the mill should be greater than 100°C. The inlet milling gas pressure is in the range of about 30 psi to 300 psi. The gaseous melting fluid may be any gas which will not decompose the fatty acid-wax component and usually air or steam.

EXAMPLE I

The Example sets out a comparison of silicas which are uncoated, wax coated, stearic or oleic acid coated and coated with a mixture of wax and stearic acid. The uncoated silicas are commercial grade silicas which are used as flatting agents for varnishes. The coated silicas are mixed with the stated nominal percent by weight of the additive and fluid energy milled using a Micronizer. The fluid energy mill is operated using heated air at 430°C and an inlet milling pressure of 60 psig. The fluid energy mill melts the additive and uniformly coats it onto the silica. The coated silica is collected in a bag collector.

The silica material is then analyzed as to its average particle size by weight using a Coulter Counter Particle Size Analyzer. The silica materials are then dispersed into a nitrocellulose lacquer (Lenmar Lacquer LL-130) using a Dispersator mixer Series 2000. The mixer is operated at the RPM stated in Table 1. After dispersing, the lacquer is deaerated.

The grind is determined using a Hegman Gage with 0-8 NS scale, approximately 5 inch groove length. A drawdown bar having a 0.033 inch wet thickness is used. The film is room temperature air dried for 5 minutes followed by drying in a static air oven for 30 minutes at 140°F. The film panel is then cooled and analyzed for Gloss at 60°, Sheen at 85° and visually for film quality on a scale of 1 (good) to 4 (poor). The gloss is determined using a Gardner 60° Glossmeter, and the sheen determined using a Gardner 85° Sheenmeter.

The Film quality is determined by making a drawdown film of the lacquer on Black Carrara glass.

ratio of wax and fatty acid to silica. The lacquer, lacquer film and silica flatting agent were analyzed by the same procedures as Example 1. A ratio of about 80:20 wax to fatty acid and content on the silica of 9-10 percent gives the better results. This gives the best settling properties to the lacquer.

Table 2

| Wax/Stearic Ratio | Analyzed* Percent | RPM | Grind | Gloss | Sheen | Film | Settling | APS |
|---|---|---|---|---|---|---|---|---|
| 100/0 | 10.1 | 2600 | 7 | 27 | 41 | 2 | 2-3 | 2.8 |
|  |  | 600 | 6 ½ | 28 | 43 | 2-3 | 2-3 | 2.8 |
|  |  | 200 | 6 ½-2 | 32 | 40 | 4 | 2 | 2.8 |
| 100/0 | 5.4 | 2600 | 7+ | 22 | 36 | 1-2 | 2-3 | 2.8 |
|  |  | 600 | 6 ½-3 | 22 | 38 | 1-2 | 2-3 | 2.8 |
|  |  | 200 | 6 ½-2 | 22 | 35 | 4 | 2-3G | 2.8 |
| 95/5 | 8.4 | 2600 | 7 | 22 | 38 | 1-2 | 3 | 3.8 |
|  |  | 600 | 7-4 | 20 | 37 | 2 | 2 | 3.8 |
|  |  | 200 | 6 ½-5 | 18 | 35 | 2-3 | 2-3 | 3.8 |
| 95/5 | 4.5 | 2600 | 7-5 | 23 | 36 | 1-2 | 2 | 3.5 |
|  |  | 600 | 6 ½-4 | 35 | 50 | 2 | 2 | 3.5 |
|  |  | 200 | 6-3 | 29 | 39 | 4 | 3G | 3.5 |
| 90/10 | 11.1 | 2600 | 6 ½-4 | 28 | 41 | 3 | 2 | 3.0 |
|  |  | 600 | 6 ½-4 | 26 | 39 | 4 | 2 | 3.0 |
|  |  | 200 | 6 ½-1 ½ | 25 | 36 | 4 | 2 | 3.0 |
| 90/10 | 5.3 | 2600 | 7-5 | 28 | 39 | 1 | 2 | 3.0 |
|  |  | 600 | 7-3 | 23 | 35 | 2 | 2 | 3.0 |
|  |  | 200 | 6 ½-3 | 23 | 35 | 3 | 2G | 3.0 |
| 80/20 | 10.9 | 2600 | 7 | 31 | 43 | 2-3 | 1 | 2.9 |
|  |  | 600 | 7-5 | 28 | 41 | 3 | 2 | 2.9 |
|  |  | 200 | 6 ½-5 | 26 | 40 | 3 | 2 | 2.9 |
| 80/20 | 9.2 | 2600 | 7 | 28 | 53 | 2 | 1 | 2.3 |
|  |  | 600 | 7 | 29 | 53 | 2 | 1 | 2.3 |
| 80/20 | 4.6 | 2600 | 7+ | 23 | 35 | 1 | 2 | 2.9 |
|  |  | 600 | 7 | 23 | 37 | 2 | 2 | 2.9 |
|  |  | 200 | 6 ½-3 | 23 | 35 | 3 | 3G | 2.9 |
| 50/50 | 9.7 | 2600 | 7 | 32 | 47 | 2 | 2 | 2.1 |
|  |  | 600 | 7-3 | 26 | 42 | 4 | 2 | 2.1 |
|  |  | 200 | 6 ½-3 | 26 | 42 | 4 | 3 | 2.1 |
| 50/50 | 4.7 | 2600 | 7 | 26 | 41 | 1 | 2 | 2.7 |
|  |  | 600 | 7-6 | 23 | 39 | 2 | 2G | 2.7 |
|  |  | 200 | 6 ½-4 ½ | 23 | 38 | 2-3 | 4 | 2.7 |

*Analyzed Percent of Wax/Stearic Acid on Silica Gel

Settling is determined by allowing a sealed jar of the lacquer to stand for 21 days. The degree of sedimentation is determined by the thickness of any sediment layer and its redispersability on shaking. The rating is on a scale of 1 (no sedimentation) to 4 (gross sedimentation). The best rating is 1.

The data of Table 1 evidences that the wax/fatty acid comixture additive has the best settling properties. Second ranked is the wax additive. The values of the other properties are acceptable for each of the films.

What is claimed is:

1. A silica gel flatting agent consisting of a silica gel melt coated with a miscible mixture of a wax and an organic fatty acid, said wax and said organic fatty acid each having a melting point above about 40°C, said melting point of said wax and of said fatty acid being less than the decomposition point of either component.

2. A silica gel flatting agent as in claim 1 wherein said flatting agent contains about 5 percent to about 30 per- Table 1

| Additive | Nominal** Percent | RPM | Grind | Gloss | Sheen | Film | Settling | APS |
|---|---|---|---|---|---|---|---|---|
| Stearic Acid | 10 | 2600 | 7+ | 27 | 51 | 2 | 4 | 2.1 |
|  |  | 600 | 7 | 25 | 49 | 2 | 4 |  |
| Oleic Acid | 10 | 2600 | 6 ½ | 25 | 50 | 2 | 4 | 2.4 |
|  |  | 600 | 6 ½ | 24 | 48 | 2 | 4 | 2.4 |
| Wax* | 10 | 2600 | 7 | 27 | 41 | 2 | 2-3 | 2.8 |
|  |  | 600 | 6 ½ | 28 | 43 | 2-3 | 2-3 | 2.8 |
| 80/20 Wax* | 10 | 2600 | 7 | 28 | 53 | 2 | 1 | 2.3 |
|  |  | 600 | 7 | 29 | 53 | 2 | 1 | 2.3 |
| (None) |  | 2600 | 5 ½ | 25 | 32 | 2-3 | 4 | 8 |
| (None) |  | 2600 | 7-5 ½ | 25 | 50 | 1-2 | 4 | 4 |

*Crown 700 Microcriptalline Wax
** Percent of additive added to Silica Gel

EXAMPLE 2

This Example gives a comparison of data for various ratios of wax to fatty acid coated onto the silica and cent by weight of said miscible mixture and about 70 percent to 95 percent by weight of silica gel.

3. A silica gel flatting agent as in claim 2 wherein said miscible mixture consists of about 5 to 50 percent by weight of said fatty acid and about 50 to 95 percent by weight of said wax.

4. A silica gel flatting agent as in claim 3 wherein said fatty acid is selected from the group consisting of stearic acid, lauric acid, palmitic acid, myristic acid, α eleosteric acid and β eleosteric acid.

5. A silica gel flatting agent as in claim 4 wherein said wax is selected from the group consisting of paraffin waxes, microcrystalline waxes and polyethylene waxes.

6. A silica gel flatting agent as in claim 5 wherein the average particle size of said melt coated silica gel is between about 3 microns and 9 microns.

7. A method for producing a silica gel flatting agent comprising melt coating onto a silica gel having an average particle size between about 2 to 10 microns, an organic fatty acid and a wax, said organic fatty acid and said wax each having a melting point above about 40°C, said melting point of said organic fatty acid and of said wax being less than the decomposition point of either component.

8. A method as in claim 7 wherein said fatty acid and said wax are admixed in a ratio of about 5 to 50 parts by weight fatty acid and about 50 to 95 parts by weight wax prior to melt coating onto said silica gel.

9. A method as in claim 8 wherein said fatty acid is selected from the group consisting of lauric acid, stearic acid, palmitic acid, myristic acid, α eleostearic acid and β eleostearic acid, and said wax is selected from the group consisting of paraffin waxes, microcrystalline waxes, and polyethylene waxes.

10. A method as in claim 8 wherein said silica gel is coated with said admixture of organic fatty acid and wax in a fluid energy mill operating at a temperature above the melting point of said organic fatty acid and said wax, which thereby concurrently melt coats said silica gel and sizes the coated silica gel to said average particle size.

11. A method as in claim 10 wherein the fluid medium within said fluid energy mill is air at a temperature of above about 50°C.

12. A method as in claim 10 wherein said silica gel fed to said fluid energy mill is a silica hydrogel, and said fluid medium within said fluid energy mill is at a temperature of above about 100°C and is selected from the group consisting of air and steam.

* * * * *